United States Patent
Lifson et al.

(10) Patent No.: US 9,139,066 B2
(45) Date of Patent: Sep. 22, 2015

(54) COMBINED OPERATION AND CONTROL OF SUCTION MODULATION AND PULSE WIDTH MODULATION VALVES

(75) Inventors: Alexander Lifson, Manlius, NY (US); Michael F. Taras, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 1584 days.

(21) Appl. No.: 12/516,222

(22) PCT Filed: Feb. 13, 2007

(86) PCT No.: PCT/US2007/003693
§ 371 (c)(1),
(2), (4) Date: May 26, 2009

(87) PCT Pub. No.: WO2008/100250
PCT Pub. Date: Aug. 21, 2008

(65) Prior Publication Data
US 2010/0064702 A1    Mar. 18, 2010

(51) Int. Cl.
F25B 41/04    (2006.01)
F25B 1/00    (2006.01)
B60H 1/00    (2006.01)

(52) U.S. Cl.
CPC .......... B60H 1/00428 (2013.01); F25B 41/043 (2013.01); F25B 2600/2521 (2013.01)

(58) Field of Classification Search
CPC .............. B60H 1/00428; F25B 41/043; F25B 2600/2521

USPC ........................................................... 62/217
See application file for complete search history.

(56) References Cited

U.S. PATENT DOCUMENTS

| | | | |
|---|---|---|---|
| 4,180,986 A * | 1/1980 | Shaw | 62/192 |
| 4,686,835 A | 8/1987 | Alsenz | |
| 4,991,643 A | 2/1991 | Price et al. | |
| 6,038,871 A * | 3/2000 | Gutierrez et al. | 62/133 |
| 6,047,556 A * | 4/2000 | Lifson | 62/196.2 |
| 6,357,241 B1 * | 3/2002 | Dudley | 62/126 |
| 6,474,087 B1 * | 11/2002 | Lifson | 62/199 |
| 6,551,069 B2 * | 4/2003 | Narney et al. | 417/53 |
| 6,672,090 B1 * | 1/2004 | Healy et al. | 62/203 |
| 6,868,685 B2 * | 3/2005 | Kim | 62/228.1 |
| 2001/0013409 A1 | 8/2001 | Burk et al. | |
| 2006/0096308 A1 | 5/2006 | Manole | |

OTHER PUBLICATIONS

Search Report and Written Opinion mailed on Nov. 20, 2007 for PCT/US2007/03693.

* cited by examiner

Primary Examiner — Allen Flanigan
Assistant Examiner — Filip Zec
(74) Attorney, Agent, or Firm — Carlson, Gaskey & Olds, PC

(57) ABSTRACT

A refrigerant system is provided with a pulse width modulation suction valve and a second valve on a line that bypasses the pulse width modulation suction valve. This second valve has a variable opening. In this manner, the pressure within the compressor shell is maintained at the lowest possible level regardless of the system operating conditions, when the pulse width modulation suction valve is cycled to a closed position. Further, the second valve can continue providing capacity control, should the pulse width modulation suction valve fail.

14 Claims, 1 Drawing Sheet

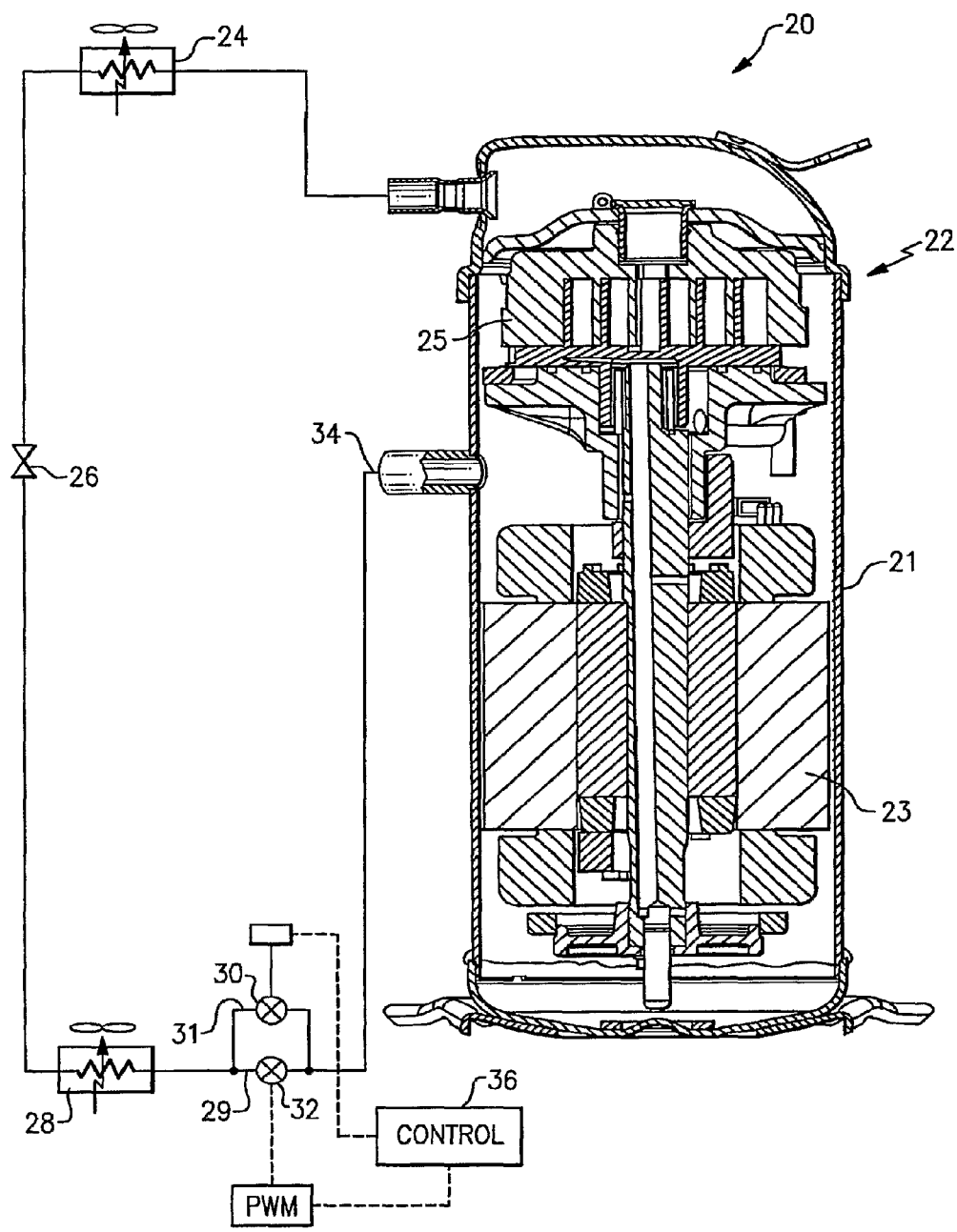

COMBINED OPERATION AND CONTROL OF SUCTION MODULATION AND PULSE WIDTH MODULATION VALVES

BACKGROUND OF THE INVENTION

This application relates to a refrigerant system wherein a pulse width modulation controlled suction valve is provided, along with an additional refrigerant flow path and a suction modulation valve. The suction modulation valve can be opened to a small degree such that when the pulse width modulation valve is closed, some refrigerant still can leak through to the suction modulation valve and avoid a potentially harmful situation in the compressor due to very low suction pressure.

Refrigerant systems are known, and are utilized to condition a secondary fluid. As an example, an air conditioning system cools and typically dehumidifies air being delivered into a climate controlled environment.

Refrigerant systems generally include a compressor compressing refrigerant and delivering that refrigerant through a discharge line to a downstream heat exchanger. From this downstream heat exchanger, refrigerant passes through an expansion device and then to another heat exchanger. The refrigerant is then returned to the compressor.

At times, it is desirable to reduce the capacity provided by the refrigerant system to match the required capacity of the conditioned environment.

One known method for reducing capacity is the use of a pulse width modulation controlled suction valve. A pulse width modulation controlled suction valve is a valve that is rapidly cycled between open and closed positions. When the pulse width modulation control valve is closed, it blocks flow of refrigerant to the compressor, and thus essentially eliminates the compression of refrigerant. Such a blockage of refrigerant flow reduces the provided capacity and power consumption.

One challenge with regard to utilizing pulse width modulation control for a suction valve and reducing the pressure to the lowest possible value, for the purpose of reducing delivered capacity, is that, when the suction valve is in the closed position, to reduce capacity to its minimum, the pressure within a compressor shell may decrease to an extremely low value to be effectively near complete vacuum. It is undesirable to have a pressure below a minimum predetermined pressure threshold in the compressor shell, as this may sometimes lead to an undesirable condition so-called "corona discharge." Also, the compressor motor can overheat causing the discharge temperature to be above the specified safe reliability limit. A "corona discharge" phenomenon can occur over the electrical terminals, and may lead to a deterioration of the terminals, and consequently to compressor failure. This minimum pressure is typically around 0.5 psia.

In the past, this problem has been addressed by having a "leaky" pulse width modulating valve (for example, a valve with a small opening in its stem), or a bypass loop has been installed around the pulse width modulating valve. The small opening through the "leaky" pulse width modulating valve or the small opening in the bypass line is sized to maintain the pressure in the compressor suction compartment above a certain minimum value mentioned above. However, due to changing operating conditions, the size of this opening would also need to be changed in relation to the operating conditions to achieve optimum performance. Since it is impossible to change the size of the opening for a fixed size restriction, it leads to less than optimum performance. The pressure needs to be above the minimum threshold value for all operating conditions, and this led to a situation where, for some operating conditions, the compressor was operating at suction pressures that were well above the minimum acceptable limit. This in turn led to lower system efficiency, because the pressure was too high to assure the efficient operation at such "off-design" conditions. Thus, a need exists to adjust the suction pressure to be just above the minimum acceptable level for all operating conditions. In other words, in the prior art, the pressure could not be controlled to a minimum acceptable level for all operating conditions, while using the fixed size restriction, causing the pressure to be higher than desired for some of the operating conditions, and leading to lower efficiency in these instances. Thus, it would be desirable to maintain the pressure at the lowest possible level when a suction valve is pulse width modulated to a closed position for all the operating conditions. Also the failure of the pulse width modulated valve, in the prior art systems, would often lead to unacceptable performance. If, for example, the pulse width modulated valve is to fail in the closed position, the compressor damage would be likely due to overheating and the system would deliver no capacity or nearly no capacity. If the pulse width modulated valve, on the other hand, is to fail in the open or any intermediate position, then the system performance would also often be unacceptable, as the capacity can no longer be modulated.

SUMMARY OF THE INVENTION

In a disclosed embodiment of this invention, a second flow path is included into a refrigerant system in parallel to a pulse width modulation controlled suction valve. This second flow path includes a separate suction modulation valve which can be opened to a small and variable degree of opening, when the pulse width modulation controlled valve is closed. Thus, a small amount of refrigerant can pass into the compressor shell, and the compressor shell will not be at an unduly low suction pressure as described above. Additionally by controlling the size of the suction modulation valve (SMV) opening when the pulse width modulation valve is closed, the pressure within the compressor shell can be maintained at constant and most desirable, optimum level, regardless of the operating conditions. Both valves can be relatively small in that they can operate in tandem at higher refrigerant flow rates. Further, the additional suction modulation valve provides a redundant valve which can be switched to being a primary valve should the pulse width modulation valve ever fail. In this case, a failure of the pulse width modulation valve would not lead to unacceptable system performance, as the system capacity would still be controlled by the opening adjustment through the suction modulation valve. Although, under such circumstances, the system efficiency may be lower than with the functioning pulse width modulation valve, operation of the suction modulation valve would still allow the refrigerant system provide necessary capacity control.

These and other features of the present invention can be best understood from the following specification and drawings, the following of which is a brief description.

BRIEF DESCRIPTION OF THE DRAWINGS

FIG. 1 shows a schematic of a refrigerant system incorporating the present invention.

DETAILED DESCRIPTION OF THE PREFERRED EMBODIMENTS

A refrigerant system 20 is illustrated in FIG. 1 having a sealed compressor 22. As is known, an electric motor 23 drives a compressor pump unit 25 to compress a refrigerant. As is mentioned above, the electric motor 23 can experience harmful "corona discharge" effects should the suction pressure within the shell 21 of the compressor 22 decrease to an unacceptably low level.

The refrigerant compressed by the compressor 22 passes downstream to a heat exchanger 24, which is typically operating as a condenser. Refrigerant having passed through the heat exchanger 24 passes downstream to an expansion device 26, and then to another heat exchanger 28, which is typically operating as an evaporator.

Downstream of the evaporator 28, the refrigerant branches into a main flow line 29 and an auxiliary flow branch line 31. The main flow line 29 passes through a pulse width modulation controlled valve 32, and returns to a suction inlet 34 of the compressor 22. Refrigerant, passing through the auxiliary flow branch line 31, passes through a suction modulation valve 30, and returns to the suction inlet 34 of the compressor 22.

A control 36 controls the valves 30 and 32 to adjust the amount of refrigerant passing to the compressor 22. Thus, the control 36 may rapidly cycle the valve 32 between open and closed positions when a reduction in capacity delivered by the refrigerant system 20 is desired. In this manner, the compressor can be operated continuously and without being turned ON and OFF. The continuous compressor operation allows for much tighter temperature control within the conditioned environment. The overall refrigerant system efficiency is also improved, as compared to other methods of continuous capacity control, such as, for example, can be accomplished by employing only a suction modulation valve. When the control 36 is cycling the valve 32, which can be, for instance, a solenoid valve cycled between open and closed positions, to be rapidly opened and closed, it may maintain the valve 30 open to a small degree. As mentioned above, normally, pressure within the compressor shell should be maintained within the range of 0.5 psia to 2 psia. Therefore, this technique allows refrigerant to pass through the branch line 31 into the suction port 34 of the compressor 22 in a very small amount. This in turn will ensure that the suction pressure within the compressor shell 21 is not unduly low, and in particular, is not below a predetermined threshold, such that the "corona discharge" effect (as well as other effects, such as compressor overheating) mentioned above could not occur. At the same time, the control 36 can control the opening of the valve 30 to vary this opening as the operating and environmental conditions change. Thus, the control can be provided with a feedback loop to change the opening of the valve 30, in accordance to the operating and environmental conditions, to ensure that the pressure within the compressor shell 21 is just above the desired safe minimum pressure. In this way, the present invention improves performance of the refrigerant system upon the prior art which sometimes has an unduly high pressure within the compressor shell due to the fixed size refrigerant flow restriction for all operating conditions.

On the other hand, should the suction pulse width modulation valve 32 ever fail, the control 36 also has algorithms to detect such a failure and switch over to utilizing the suction modulation valve 30 to controlling the refrigerant system capacity. The operation of the suction modulation valve 30 to control the refrigerant system capacity is known in the art. Further, due to the use of the two valves 30 and 32, each valve may be smaller in size than if each of those valves were employed independently. For the operating conditions where both valves need to be fully open to reduce the pressure drop through the valves and maximize the amount of refrigerant flow passing through the compressor, the combined open cross-sectional area of the two valves 30 and 32 need only be equal to the open cross-sectional area of the valve that would have been operating by itself. Thus, the features described above allow this invention to be efficiently and inexpensively incorporated into a refrigerant system.

It should be pointed out that many different compressor types could be used in this invention. For example, scroll, screw, rotary, or reciprocating compressors can be employed.

The refrigerant systems that utilize this invention can be used in many different applications, including, but not limited to, air conditioning systems, heat pump systems, marine container units, refrigeration truck-trailer units, and supermarket refrigeration systems.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A refrigerant system comprising:
    a compressor, said compressor having an electric motor driving a compressor pump unit, and being housed within a compressor shell;
    a first heat exchanger downstream of said compressor, an expansion device downstream of said first heat exchanger, a second heat exchanger downstream of said expansion device, and refrigerant passing from said compressor through said first heat exchanger, through said expansion device, to said second heat exchanger, and then returning through a suction port back into said compressor shell;
    refrigerant passing from said second heat exchanger to a main flow line having a pulse width modulation controlled valve, and a branch line having a second valve, said second valve having a controllable opening to control pressure within said compressor shell; and
    said second valve controlling said pressure between 0.5 psia and 2 psia, when said pulse width modulation valve is in a closed position.

2. The refrigerant system as set forth in claim 1, wherein said second valve is an electronically controlled valve.

3. The refrigerant system as set forth in claim 2, wherein said second valve is a suction modulation valve.

4. The refrigerant system as set forth in claim 2, wherein said pulse width modulation valve is a solenoid valve.

5. The refrigerant system as set forth in claim 2, wherein said second valve can be utilized as a main valve, if it has been determined that said pulse width modulation controlled valve has failed.

6. The refrigerant system as set forth in claim 2, wherein said second valve has an opening the size of which is controlled dependent upon system operating conditions.

7. The refrigerant system as set forth in claim 2, wherein said second valve is an electronically controlled valve, and a control for said second valve being provided with a feedback loop indicative of a pressure within said compressor shell.

8. A method of operating a refrigerant system comprising the steps of:
    a) providing a compressor, said compressor having an electric motor driving a compressor pump unit, and being housed within a compressor shell;
    b) providing a first heat exchanger downstream of said compressor, an expansion device downstream of said first heat exchanger, a second heat exchanger downstream of said expansion device, and refrigerant passing from said compressor through said first heat exchanger, through said expansion device, to said second heat exchanger, and then returning through a suction port back into said compressor shell; and c) passing refrigerant from said second heat exchanger to a main flow line having a pulse width modulation controlled valve, and a branch line having a second valve, said second valve having an opening that is controlled to control pressure within said compressor shell and said second valve controlling said pressure between 0.5 psia and 2 psia, when said pulse width modulation valve is in a closed position.

9. The method as set forth in claim 8, wherein said second valve is an electronically controlled valve.

10. The method as set forth in claim 9, wherein said second valve is a suction modulation valve.

11. The method as set forth in claim 9, wherein said pulse width modulation valve is a solenoid valve.

12. The method as set forth in claim 9, wherein said second valve can be utilized as a main valve, if it has been determined that said pulse width modulation controlled valve has failed.

13. The method as set forth in claim 9, wherein said second valve has an opening the size of which is controlled dependent upon system operating conditions.

14. The method as set forth in claim 9, wherein said second valve is an electronically controlled valve, and a control for said second valve being provided with a feedback loop indicative of a pressure within said compressor shell.

* * * * *